United States Patent [19]
Stiller et al.

[11] Patent Number: 5,628,169
[45] Date of Patent: May 13, 1997

[54] METHOD AND APPARATUS FOR SUPPORTING A TURF MOWER CUTTING UNIT

[76] Inventors: Daniel G. Stiller, 14955 Monterey Ave. S., Savage, Minn. 55378; Jack R. Gust, 874 Haralson Dr., Apple Valley, Minn. 55124

[21] Appl. No.: 395,398

[22] Filed: Feb. 22, 1995

Related U.S. Application Data

[63] Continuation-in-part of Ser. No. 376,335, Jan. 20, 1995, abandoned.

[51] Int. Cl.⁶ ................................................. A01D 34/44
[52] U.S. Cl. ............................ 56/7; 56/249; 56/294
[58] Field of Search ........................ 56/7, 249, 294, 56/253

[56] References Cited

U.S. PATENT DOCUMENTS

| | | |
|---|---|---|
| 1,014,663 | 1/1912 | Mustin . |
| 1,069,736 | 8/1913 | Shorman . |
| 1,164,305 | 12/1915 | Nilson . |
| 2,335,054 | 7/1943 | Godwin ........................ 56/26 |
| 2,724,227 | 6/1955 | Godwin ........................ 56/7 |
| 2,763,977 | 9/1956 | Spencer, Jr. et al. . |
| 3,063,226 | 11/1962 | Pfauser . |
| 3,077,065 | 2/1963 | Samways et al. . |

(List continued on next page.)

FOREIGN PATENT DOCUMENTS

| | | |
|---|---|---|
| 0116661 | 8/1984 | European Pat. Off. . |
| 123561 | 10/1984 | European Pat. Off. . |
| 1499066 | 10/1967 | France . |
| 1568923 | 5/1969 | France . |
| 1566084 | 5/1969 | France . |
| 2189990 | 1/1974 | France . |
| 2232980 | 1/1975 | France . |
| 2414863 | 8/1979 | France . |
| 2091325 | 1/1992 | France . |
| 1202554 | 10/1965 | Germany . |
| 293079 | 10/1969 | Germany . |
| 1457953 | 7/1970 | Germany . |
| 1782238 | 7/1971 | Germany . |
| 2143315 | 3/1973 | Germany . |
| 2653974 | 6/1978 | Germany . |
| 2833814 | 2/1980 | Germany . |
| 3151481 | 7/1983 | Germany . |
| 3336695 | 4/1985 | Germany . |
| 8631593 | 2/1988 | Germany . |
| 299716 | 8/1965 | Netherlands . |
| 399041 | 3/1966 | Switzerland . |
| 2007958 | 5/1979 | United Kingdom . |
| 2052237 | 1/1981 | United Kingdom . |

OTHER PUBLICATIONS

Kongskilde, "Germinator, Seedbed Cultivator", 1985, pp. 1–6.

Toro brochure entitled "Reelmaster® 5100–D with Automated Control Electronics,"© 1992.

Section 8.11, entitled "Free–Link Operation of Three–Point Hitches," pp. 185,186, Principles of Farm Machinery, third edition, R. A. Kepner et al, AVI Publishing Company, Inc.,© 1978.

*Primary Examiner*—Terry Lee Melius
*Attorney, Agent, or Firm*—R. Lawrence Buckley

[57] ABSTRACT

One aspect of the invention relates to a cutting unit joint (22) which can be located between a lift arm (18) and a cutting unit (20). Cutting unit joint (22) includes a four-bar linkage preferably including pairs of pivoting links (46 and 48) which create a "virtual pull point" at any desired location. With regard to one embodiment, a cutting unit (20), the virtual pull point is even located below ground, when the cutting unit (20) is generally level. This configuration reduces or eliminates cutting unit "bobbing." In another embodiment, in connection with a cutting unit (20'), the virtual pull point is located roughly at the centerline of the reel, to maintain a good "seal" between the cutting unit (20') and a lift arm supported grass basket (52'). Another aspect of the present invention relates to a self-contained damper (76) connected to lift arm (18), the damper (76) resisting upward movement at a velocity or frequency consistent with cutting unit "bobbing."

10 Claims, 8 Drawing Sheets

U.S. PATENT DOCUMENTS

| | | |
|---|---|---|
| 3,608,288 | 9/1971 | Heth et al. . |
| 3,624,988 | 12/1971 | Aldred .................................... 56/7 |
| 3,646,738 | 3/1972 | Tiura . |
| 3,665,689 | 5/1972 | Richardson . |
| 3,795,094 | 3/1974 | Mollen et al. . |
| 3,910,019 | 10/1975 | Schlittler . |
| 4,026,093 | 5/1977 | Knusting . |
| 4,162,606 | 7/1979 | Weichel . |
| 4,203,277 | 5/1980 | Kaetzel . |
| 4,218,865 | 8/1980 | Chaumont et al. . |
| 4,286,423 | 9/1981 | Caldwell et al. . |
| 4,301,643 | 11/1981 | Bailey et al. . |
| 4,343,138 | 8/1982 | Neuerburg . |
| 4,353,422 | 10/1982 | Benett, Jr. . |
| 4,438,619 | 3/1984 | Heim et al. . |
| 4,691,505 | 9/1987 | Browne . |
| 4,747,255 | 5/1988 | Roden . |
| 4,864,805 | 9/1989 | Hager .................................... 56/11.9 |
| 4,907,400 | 3/1990 | Roden . |
| 4,926,621 | 5/1990 | Torras .................................... 56/DIG. 22 X |
| 4,972,661 | 11/1990 | Rodan .................................... 56/1 |
| 4,998,948 | 3/1991 | Osterling .................................... 56/DIG. 9 X |
| 5,042,236 | 8/1991 | Lamusga et al. .................................... 56/7 |
| 5,193,330 | 3/1993 | Nusser .................................... 56/6 |
| 5,293,729 | 3/1994 | Curry et al. .................................... 56/7 |
| 5,297,378 | 3/1994 | Smith .................................... 56/7 |
| 5,343,680 | 9/1994 | Reichen et al. .................................... 56/294 X |

METHOD AND APPARATUS FOR SUPPORTING A TURF MOWER CUTTING UNIT

This is a continuation-in-part of application Ser. No. 08/376,335, filed Jan. 20, 1995, now abandoned.

TECHNICAL FIELD

The invention relates generally to turf maintenance equipment, and more particularly to a method and apparatus for mounting a cutting unit to the traction vehicle of a power turf mower.

BACKGROUND OF THE INVENTION

Many types of power turf mowing equipment are known. Such equipment can generally be classified as those mowers which include a rotary cutting unit(s) or those which include a reel cutting unit(s). A rotary cutting unit usually includes one or more rigid, generally straight, steel blades rotated within a housing about a vertical axis to sever grass or other vegetation at a predetermined height above the ground. A reel cutting unit, on the other hand, typically includes a frame within which is horizontally rotatably mounted a reel possessing a plurality of arcuate blades. The rotating reel blades pass in close proximity to a bedknife which spans the cutting unit frame parallel to the horizontal reel axis. Grass blades are sheared at the reel blade/bedknife interface.

While rotary cutting units are suitable for many purposes, it is generally perceived that reel units provide a higher quality cut. The present invention relates primarily to turf reel mowers, and the remainder of this discussion will focus on same. As is well known, another reel-like unit is used to produce a "verticut," and this type of cutting unit is also contemplated.

Power turf mowing equipment can also be categorized based on the method of propelling the cutting units. Generally, there are walk-behind, riding, and towed turf mowers. The present invention relates primarily though not exclusively to riding turf mowers, and for the sake of brevity the invention will hereafter be discussed in terms of commercial riding mowers having one or more reel cutting units.

Riding reel-type turf mowers typically include a traction vehicle supported by a plurality of wheels, including one or more traction wheels; a prime mover supported by the vehicle frame and connected through a transmission to the traction wheel(s); one or more reel-type cutting units, powered by the prime mover through belts or hydraulic motors, for example; one or more cutting unit lift arms pivotally mounted to the traction vehicle; a "pivot joint" between each lift arm and the vehicle; and a "cutting unit joint" between each cutting unit and its corresponding lift arm. Over the years, much effort has been directed to improving the quality of cut afforded by reel-type mowers. These efforts have been concentrated primarily in two areas, namely the cutting units themselves and the technique by which the cutting units are connected to the traction unit. The present invention relates in particular to a unique cutting unit suspension technique which can address any of a wide variety of cutting unit support problems, including but not limited to cutting unit "bobbing"; and providing a good "seal" between a floating cutting unit and a lift arm supported grass catcher. Each of these particular examples of problems which can be addressed by the cutting unit suspension technique of the present invention is discussed below.

Cutting Unit Bobbing

One absolutely critical capability of reel-type riding mowers, particularly those for use on golf courses, is to be able to cut the turf with great precision. That is, the height of cut must be extremely consistent across the entire width of the mower, regardless of the terrain. This requires that the cutting unit(s) "float" relative to the traction vehicle. A truly free-floating reel unit can follow the contours or undulations of the ground irrespective of the relatively gross motion of the traction vehicle. If reel units are not supported in a floating manner, they tend to scalp the higher regions and skip over the lower regions.

The pivot joint typically allows for one "degree of freedom" of the cutting unit: if the cutting unit needs to move up or down, relative to the traction vehicle, to follow turf undulations, the lift arm pivots on the traction vehicle to permit this to happen. But it is the cutting unit joint, the joint between the lift arm and the cutting unit, that is usually called upon to provide most of the flexibility needed to accommodate a more or less free-floating cutting unit. That is, the cutting unit joint typically provides for the other degrees of freedom often associated with a high precision floating cutting unit of the type used on golf courses and similarly demanding locations. These other degrees of freedom can include "rolling" (pivoting side to side about a longitudinal axis); "yawing" (pivoting about a vertical axis); and "pitching" (pivoting about a lateral axis), to make use of aviation terms to describe various motions of a reel-type cutting unit as it follows the turf.

While floating the reel unit(s) is desirable, for the reasons set forth above, it can be carried too far. If the connection between the reel unit and the lift arm is too "floppy," it can cause the reel unit to be difficult to handle in its raised transport position; and, it is believed, can also contribute to "bobbing" of the reel unit in some conditions. Bobbing takes place when the rearward resistance imposed by the turf on the front roller of the cutting unit causes the cutting unit to "pitch" downwardly due to the manner in which the cutting unit is suspended from the lift arm. Once the turf is sufficiently compressed by the front roller, in a spring-like manner, the front roller of the cutting unit is vaulted upwardly a short distance, and the pattern repeats itself over and over in an oscillating fashion. This up and down oscillation, or "bobbing," can create subtle but unacceptable ripples in the cut swath. The degree to which bobbing occurs is thought to depend on a variety of factors, including the mower speed, the manner in which the reel is connected to and supported by the traction vehicle, and the turf conditions.

In order to provide cutting unit floating while at the same time preventing cutting unit bobbing, attempts have been made to try to place more of the weight of the cutting unit on the rear roller to reduce the pitching forward effect described above. For example, The Toro Company, assignee herein, has used springs acting between the lift arm and the cutting unit to cause greater pressure on the rear roller and less pressure on the front roller of the cutting unit. Similarly, John Deere has attached the lift arm toward the rear of the cutting unit, again to reduce the pressure on the front roller. Both of these techniques are somewhat helpful in that the front roller will not tend to pitch forward as much, depending of course on the turf conditions and the forward speed of the traction vehicle. But in both cases, bobbing can still occur since at some point the cutting unit will nose (pitch) downwardly once the rolling resistance gets to a point where the cutting unit tends to rock or tip forwardly.

Attempts have also been made to address the bobbing problem at the pivot joint. The Toro Company, assignee herein, has tried using spring down pressure on the lift arm to improve ground following (see U.S. Pat. No. 5,042,236), and at least one company has seemingly attempted to compensate for bobbing oscillations using the lift cylinder(s) and associated hydraulic system (i.e., pump(s), valves, etc.). While these attempts directed not to the cutting unit joint but rather to the pivot joint might partially control bobbing, they do not control it appreciably.

An important aspect of the present invention is a cutting unit support technique that addresses the bobbing problem in a systematic way, which in a preferred embodiment involves the pivot joint as well as the cutting unit joint.

"Seal" Between Grass Catcher and Cutting Unit

As discussed above, an important function of a typical cutting unit joint is to help "float" the cutting unit in a controlled manner. But there are other problems that can or must be addressed by the cutting unit joint(s). For example, the cutting unit joint(s) must, for some mowers, accommodate a grass catcher. In many high precision reel mowers used on golf courses, for example, the grass catcher is actually supported by the lift arm, not by the cutting unit. The theory is that the cutting unit would cut inconsistently if it had to bear the variable weight of the grass catcher (i.e., variable by virtue of the fact that the catcher becomes heavier as it becomes filled with grass clippings). In such high precision mowers, the manner in which the lift arm supports the cutting unit and the grass catcher must permit sufficient floating of the cutting unit, to allow it to accurately follow the ground undulations, while at the same time ensuring a good "seal" between the cutting unit and the grass catcher. Otherwise, clippings would not be efficiently collected, and an unacceptably large percentage of same would end up on the turf rather than in the grass basket.

The present invention includes a cutting unit joint which can provide a good "seal" between the cutting unit and the grass catcher, even when the cutting unit is "floating" relative to the lift arm to follow ground undulations.

Thus there is a wide variety of problems associated with suspending a high precision cutting unit from a traction vehicle. Floating the reel unit, in a manner that reduces or eliminates cutting unit bobbing, is one particularly important problem. Another is accommodating a grass catcher. The cutting unit suspension technique of the present invention addresses these two problems, and more.

SUMMARY OF THE INVENTION

Accordingly, in broad terms one aspect of the invention is directed to a turf maintenance machine including a traction vehicle; a cutting unit; and means including a four-bar linkage for connecting the cutting unit to the traction vehicle.

Another aspect of the invention is directed to a turf maintenance machine including a traction vehicle; a cutting unit; a cutting unit support system connecting the cutting unit to the traction vehicle; and a self-contained damper operatively connected to the cutting unit support system which prevents sudden movement of the cutting unit consistent with cutting unit bobbing.

In a preferred embodiment, the turf maintenance machine referred to above includes a lift arm; a pivot joint connecting the lift arm to the traction vehicle; and a cutting unit joint connecting the cutting unit to the lift arm, wherein the four-bar linkage is a component of the cutting unit joint.

In another preferred embodiment, the turf maintenance machine(s) referred to above having the four-bar linkage also include(s) a self-contained damper which prevents sudden upward movement of the lift arm at a velocity or frequency consistent with cutting unit bobbing.

In one embodiment of the present invention, the "virtual pull point" established by the four-bar linkage is generally below grade, at least when the cutting unit is on generally level ground, whereby cutting unit bobbing is substantially eliminated.

In another embodiment of the present invention, a grass basket is supported by the lift arm of the turf maintenance machine, and the virtual pull point established by the four-bar linkage is located proximate the transverse centerline of the reel, whereby the seal between the grass basket and the cutting unit is maintained even as the cutting unit follows the contour of the turf.

Additional features of the invention are described herein.

BRIEF DESCRIPTION OF THE DRAWINGS

The invention will be further described with reference to the Drawings, wherein:

FIG. 5 is a top plan view of the cutting unit joint of the cutting unit of FIG. 2;

DETAILED DESCRIPTION OF THE INVENTION

Figure 1:
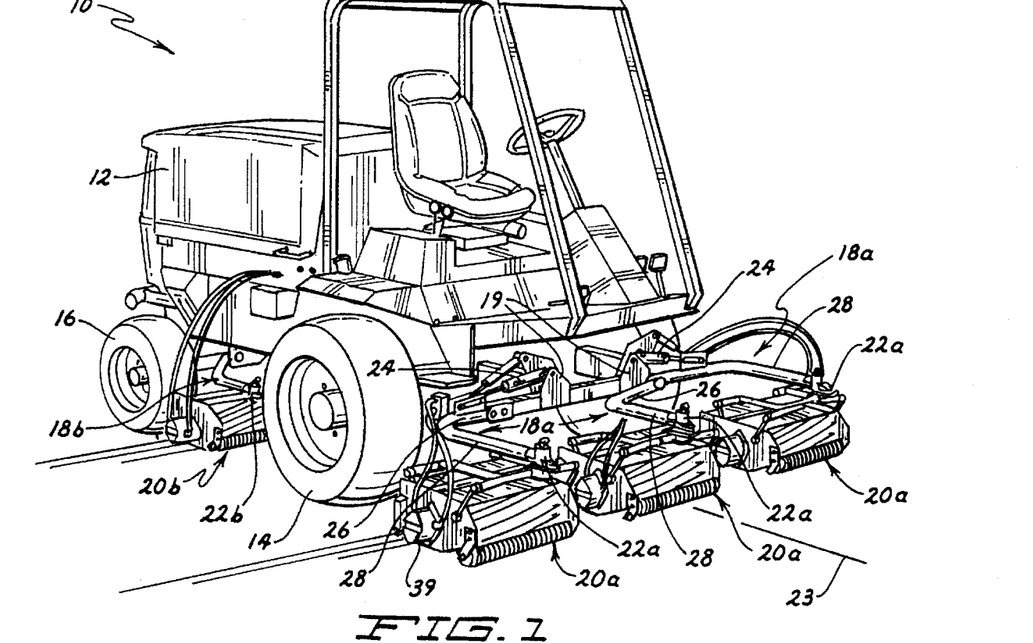
FIG. 1 is a perspective view of a turf maintenance machine having several reel-type cutting units supported using the techniques of the present invention.

Referring to the Drawings, wherein like reference numerals designate like parts and assemblies throughout the several views, FIG. 1 shows a perspective view of a preferred turf maintenance machine 10 according to the invention. Machine 10 is preferably a reel-type turf mower generally of the type represented by the Reelmaster® 5300 mower sold by The Toro Company, assignee herein; but those skilled in the art will appreciate that the present invention could be applied to other types of turf maintenance equipment. Mower 10 includes a traction vehicle 12 supported by a pair of front drive wheels 14 appropriately coupled through a transmission (not shown) to a prime mover (also not shown). A pair of rear steerable wheels 16 support the rearward end of vehicle 12.

Turf maintenance machine 10 can be used in a variety of turf maintenance capacities, e.g., mowing and dethatching. Hydraulically-powered tools are operatively connected to vehicle 12 for these purposes. A plurality of front tool-supporting lift arms 18a are pivotally connected to the front central portion of a frame 19 of vehicle 12. Similarly, a plurality of rear tool-supporting lift arms 18b are pivotally connected to the frame 19 of vehicle 12 proximate to its longitudinal mid-point. The front lift arms 18a are, in a preferred embodiment, actually pivotally coupled to a sub-frame sometimes called the tractor carrier frame. The rear lift arms 18b, by contrast, attach directly to the frame of traction vehicle 12, with similar pivot joints. The tractor carrier frame mainly facilitates manufactureability, and certainly all of the lift arms 18 could be attached directly to the main frame of the traction vehicle 12.

A front reel unit 20a is coupled to each front lift arm 18a through a unique cutting unit joint 22a which includes a "four-bar linkage," as further described below. A rear reel unit 20b is coupled to each rear lift arm 18b, through the use of a cutting unit joint 22b which is preferably substantially identical to cutting unit joint 22a. One aspect of the present invention is particularly directed to the cutting unit joints 22, and they will be described in some detail below.

In the preferred embodiment, there are three front cutting units 20a spaced along a line generally perpendicular to a fore-and-aft or longitudinal axis 23 of mower 10 and directly in front of the drive wheels 14; and two rear cutting units 20b roughly centered between vehicle wheels 14 and 16 and also arranged along a line which is generally perpendicular to the longitudinal axis 23 of the mower. As known by those skilled in the art, the rear cutting units 20b overlap the front cutting units 20a to handle the uncut strips of grass between the front cutting units.

In the preferred embodiment, the front and rear cutting units 20 and related support structures are substantially identical in all pertinent respects, and therefore the "a" and "b" suffixes will not hereafter be used in most instances. In fact, in a preferred embodiment the front and rear cutting units are completely interchangeable.

Each cutting unit 20 can be raised from a normal operating position to a transport position wherein the cutting unit 20 is up out of engagement with the turf. Paired with each cutting unit 20 is a hydraulic lift cylinder 24, selectively operable by the operator. Each lift cylinder 24 is arranged such that its cylinder is pivotally secured to vehicle frame (or sub-frame) 19, and its piston or rod is similarly secured to the corresponding lift arm 18. Each hydraulic lift cylinder 24 is capable of lifting its associated reel unit 20 from the operating position to the transport position. Reel units 20 are for the most part shown in their operating positions in the Drawings, but those skilled in the art will recognize that the reel units can be selectively raised for transportation purposes and to permit the operator to mow a narrower swath or to relatively rapidly move to a different work area, for example.

Each lift arm 18 is preferably constructed from 2.25 inch O.D., 0.188 inch wall thickness, steel tube, and can include a lateral portion 26 suitably connected to frame 19 and a longitudinal portion 28 generally perpendicular thereto. The lateral portion 26 of each lift arm 18 can be contained within a vertical plane which is generally perpendicular to a vertical plane containing mower longitudinal axis 23. The longitudinal portion 28 of each lift arm 18 is generally parallel to the longitudinal axis 23 of mower 10. The free end of each lift arm longitudinal portion 28 carries the associated cutting unit joint 22 which in turn carries the corresponding cutting unit 20. The other end of the lift arm, actually one end of the lift arm lateral portion 26, is connected to the traction vehicle 12 by means of a pivot joint 27. The present invention is particularly directed to the pivot joint 27 and the cutting unit joint 22, and preferred such joints will be further described below in some detail.

Figure 2:
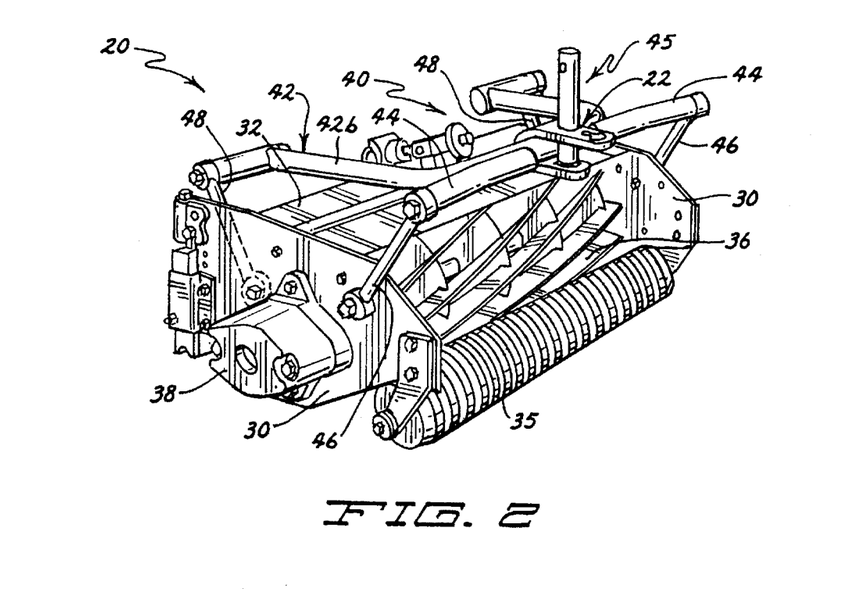
FIG. 2 is an enlarged perspective view of the left front reel-type cutting unit of the turf maintenance machine of FIG. 1.

An enlarged perspective view of the left (as viewed by the operator) front reel unit 20 and the preferred cutting unit joint 22 are shown in FIG. 2. Although the particular construction of reel unit 20 is not central to the invention, the basic components of reel unit 20 will be described. A pair of generally rectangular side plates 30 are located at opposite ends of the reel unit 20. Plates 30 are spanned at the top by a steel channel piece 32 and at the bottom by a rear roller 37 (shown in FIG. 3) and a front roller 35. As shown in FIG. 2, the front roller 35 can be a so-called "Wiehle" roller, having a series of circumferential grooves across its entire width. Also spanning the end plates 30 is a horizontally centrally mounted rotatable reel 36 which is coupled to a hydraulic motor (not shown in FIG. 2). On the side opposite from the hydraulic motor is a counterweight 38, the purpose of which is to provide a counterbalancing force as against the hydraulic motor (not shown in FIG. 2; a hydraulic motor 39 is shown on the right side of the right front cutting unit in FIG. 1), to maintain a consistent turf pressure across the entire width of the cutting unit and to minimize "yaw" and "roll" of the cutting unit during transport to keep the cutting unit in a substantially level orientation. Thus, reel unit 20 is a substantially self-supporting unit which is pulled across the ground on rollers, the cutting blade of which is powered through a hydraulic connection with the traction vehicle 12. A bedknife 59 (shown in the middle drawing of FIG. 3) also spans between end plates 30 and is situated proximate the lower outer periphery of reel 36 so that when reel 36 spins its blades come into close proximity to the bedknife to shear the grass blades.

It should be noted that the "stance" or wheelbase of cutting unit 20 is preferably larger than that of the Reelmaster® 5100/5300, the assignee's predecessor machine. The wheelbase of cutting unit 20, i.e., the distance between the centerlines of rollers 35 and 37, is 12.25 inches or 14.11 inches, depending on the position of the front roller (the front roller being carried by a bracket which can be "flipped" from one position to another to change the wheelbase). By contrast, the wheelbase of the Reelmaster® 5100/5300 cutting units is 9.66 inches or 11.70 inches, again depending on the selected position of a two-position bracket.

Figure 4:
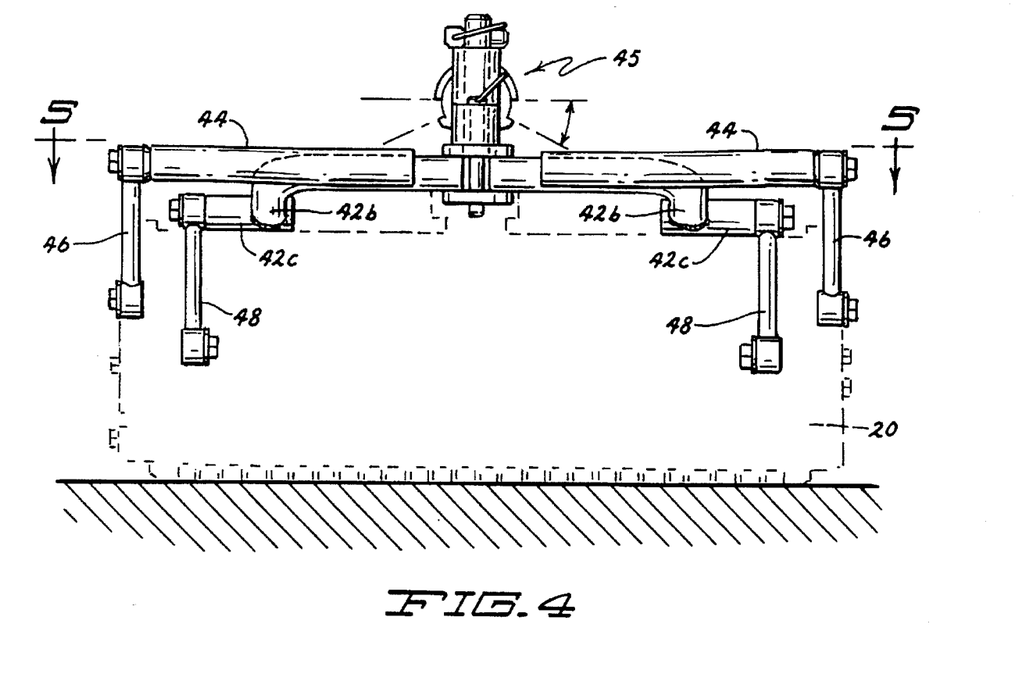
FIG. 4 is a front elevational view of the cutting unit joint of the cutting unit of FIG. 2, illustrating "rolling" of the cutting unit.

Referring to FIGS. 2, 4 and 5, cutting unit 20 is suspended from a cutting unit support frame 40 consisting of a rearwardly opening U-shaped rear frame element 42 and a pair of laterally extending, generally straight, forward frame elements 44. Frame elements 42 and 44 generally lie in a plane which is just below the longitudinal portions 28 of lift arms 18. Forward frame elements 44 are located on either side of a steering assembly 45 connected to the front central portion of rear frame element 42. Each forward frame element 44 includes a fixed end welded to the forwardmost leg of the "U" of rear frame element 42; and a free end located generally above the corresponding side plate 30. Referring to FIG. 5 in particular, rear frame element 42 has a forwardmost leg 42a in effect extending laterally through steering assembly 45, and a pair of rearwardly extending legs 42b generally perpendicular to leg 42a which extend longitudinally and which terminate toward the rear of the cutting unit 20, having laterally outward extensions 42c at the rear to position the rearward ends of frame element 42 generally over the rear portion of the corresponding side frame 30. Extending downwardly and pivotally from the side plate support frame 40 is a pair of forward links 46 and a pair of rearward links 48. Links 46 and 48 are pivotally attached to the side plates 30 and side plate support frame 40. Cutting unit carrier frame 40 and pivotal links 46 and 48 collectively comprise a four-bar linkage which produces a "virtual pull point" in a location depending on the "focal point" of links 46 and 48, as further described below.

Figure 3:
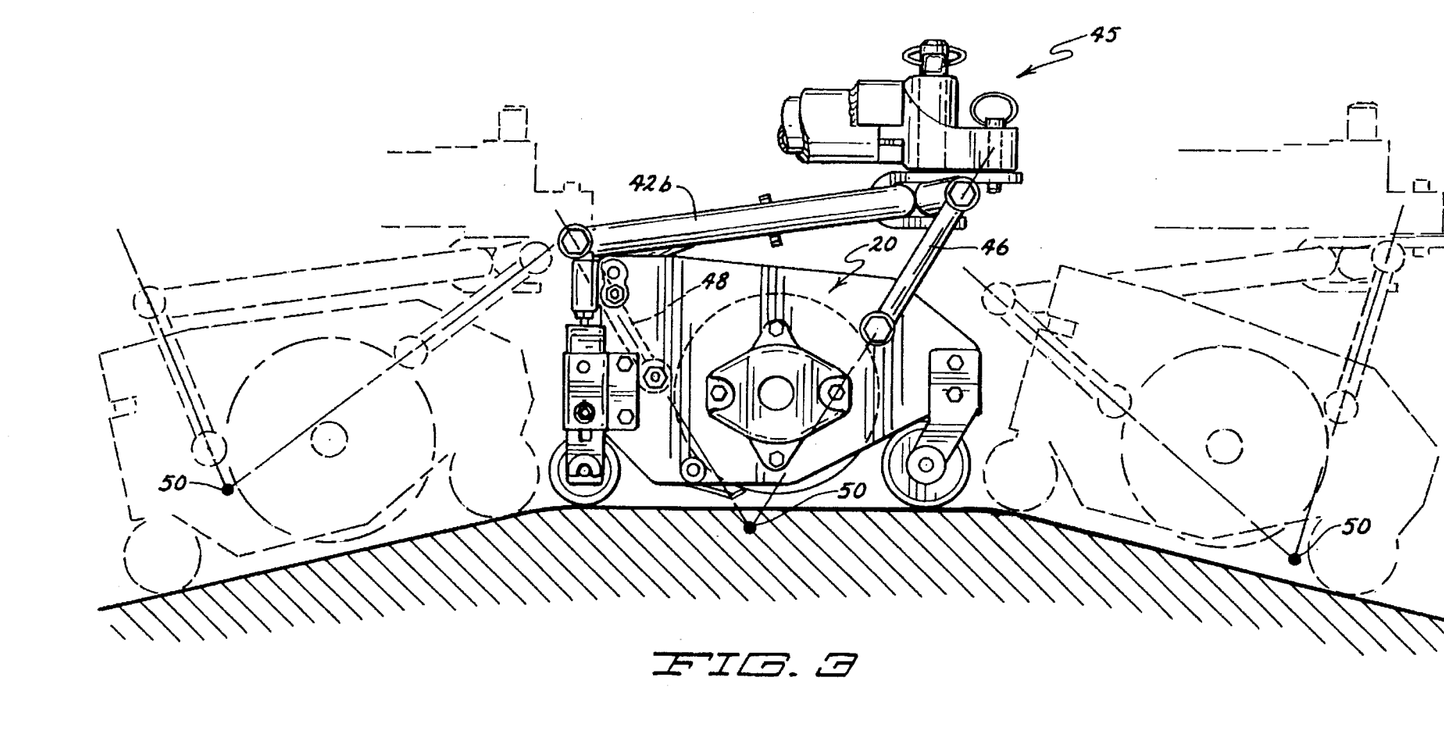
FIG. 3 is a side elevational view of the cutting unit of FIG. 2, showing the cutting unit in three positions as it traverses a small hill.

Referring to FIGS. 2 and 3, links 46 act generally in parallel with one another, and similarly links 48 act generally in parallel with one another. Links 46 and 48 are preferably constructed from cast steel and are about 5.75 inches long. The pivot or revolute joints, both at the cutting unit frame 40 and at the side plates 30, are constructed in a standard manner using bushings, studs and the like. Referring to FIG. 3, the actual pivot point 49 (as opposed to the "virtual pull point," discussed further below) of each forward link 46 on the corresponding side plate 30 is located roughly midway between the centerline 51 of the cutting reel and the centerline 53 of the forward roller, fore-and-aft; and about midway between the upper edge of each side plate 30 and the centerline 51 of the cutting reel, top to bottom. As also shown in FIG. 3, the actual pivot point 55 for each rearward link 48 is located about midway between the centerline 51 of the cutting reel and the centerline 57 of the rear roller 37, fore-and-aft; and at about the same vertical location as the centerline 51 of the reel. Clearly the actual pivot points for the links 46 and 48 could be located in other locations in different embodiments of the present invention, since the location of the "virtual pull point" (discussed further below) is the key, not the locations of the actual link pivot points. It should be noted that links 46 and 48 can be simple straight elements as shown in the Drawing, or can alternatively have other shapes. Regardless of the shape of a given link, the effective link would lie along a straight line extending through the actual pivot points.

The specifics of certain aspects of the preferred cutting unit suspension system, not related to the four-bar linkage, are described in co-pending patent application entitled "OPERATING UNIT JOINT FOR TURF MAINTENANCE EQUIPMENT," filed on even date herewith, assigned to the assignee herein, and incorporated herein by reference.

FIG. 3 shows a somewhat diagrammatic side elevational view of cutting unit 20 as it traverses a small hill. The middle drawing, in solid line, shows cutting unit 20 more or less on level ground. Notably, the "focal point" 50 of links 46 and 48 is actually located below grade. This focal point is the so-called "instant center" or "instantaneous center" of a four-bar linkage consisting of cutting unit carrier frame 40 as a first "bar"; cutting unit 20 as a second "bar"; and links 46 and 48 as the third and fourth "bars." Instant center 50 constitutes the "virtual pull point" for cutting unit 20, in the sense that cutting unit 20 will behave, at this particular instant of time (i.e., when the four-bar linkage is in the particular position shown in the drawing), as if the cutting unit were not being pulled by steering joint 45 or links 46 or 48 alone, but rather pulled by or at the virtual pull point 50, the location of which corresponds with the "focal point" of links 46 and 48. The concept of an instant center or instantaneous center of a four-bar linkage is well known to engineers; however, as far as Applicants know, this concept has never been applied to a turf mower, in order to in effect place the pull point for the cutting unit at any desired location.

As can be seen in FIG. 3, the instant center 50 of the four-bar linkage shifts as the cutting unit 20 traverses the hill. It shifts because the relative positions of the various links or bars shaft, and this changes the focal point of links 46 and 48. On generally level ground, as shown in the middle drawing of FIG. 3, the virtual pull point or instant center 50 is actually located below grade (i.e., underground), generally aligned with the centerline 51 of the cutting reel fore-and-aft, or more specifically just forward of the leading edge of bedknife 59 of cutting unit 20.

Still referring to FIG. 3, when the cutting unit 20 is on generally level ground, the angle 61 between links 46 and 48 is about 62 degrees. When the cutting unit is climbing a grade of about 15 degrees measured from the horizontal, as shown on the left hand side of FIG. 3 in phantom line, the angle 61 between links 46 and 48 is about 69 degrees. When the cutting unit 20 is descending a hill of about 15 degrees, measured from the horizontal, the angle between links 46 and 48 is about 62 degrees. If cutting unit 20 were to traverse a hill as shown in FIG. 3, instant center 50 would, in a sense, trace an upwardly turned curve or "smile," having its low point located as shown in the middle (level ground) drawing of FIG. 3, and having the upper corners of the "smile" located as shown in the left and right hand drawings of FIG. 3. The shape of the "smile" would depend, among other things, on the overall configuration of links 46 and 48, in terms of their relative lengths, and their actual pivot locations.

Applicants believe that the shifting of the virtual pull point actually enhances ground following. Referring to FIG. 3, when ascending a hill the virtual pull point 50 automatically shifts to the rear, proximate the rear roller 37. This in effect unloads the front roller 35 so that it isn't driven into the side of the hill in such a way as to scalp the high areas, but rather is "light" enough so that it can remain responsive to further changes in the topography. When descending, the virtual pull point 50 automatically shifts into proximity with front roller 35, forcing the front roller 35 down into the hill so that the cutting unit doesn't tend to skip over the low areas.

One objective, particularly with regard to cutting unit 20, was to eliminate "bobbing" by means of the four-bar linkage. That being the case, it was decided to locate the "virtual pull point" roughly in line with the front edge of the bedknife 59 and slightly below grade, when the cutting unit 20 is on generally level ground (as shown in the middle, solid line drawing of FIG. 3). While the instant center of the linkage depicted in FIG. 3 certainly shifts fore-and-aft and up-and-down, it can be seen that the instant center is generally located at or below an imaginary line 63 passing through the centerlines 53 and 57 of the support rollers of cutting unit 20. The rationale behind lowering the pull point, by means of a four-bar linkage, is as follows: as noted above, bobbing is caused by the cutting unit "pitching" or nosing downwardly due to the rolling resistance on the front roller. When this happens, the turf in effect acts like a spring, and eventually pushes upwardly on the front roller enough to vault the front roller upwardly, and the whole process repeats itself over and over again. By locating the "virtual pull point" at a very low point, when the cutting unit rollers encounter resistance in the turf, this actually causes the front roller not to further compress the turf, but rather to pivot in the opposite direction, thus unloading the resistance forces from the front roller. Similar unloading occurs when resistance forces are encountered at the rear roller. The net effect is a system that seeks equilibrium. Thus, cutting unit 20 in effect behaves as if it were pivoting about a point located quite low, even below grade in some circumstances; and "bobbing" is considerably reduced if not eliminated.

Links 46 and 48 still permit controlled "pitching" in order to accommodate ground following as much as possible. Although the "pitching" movement created by the four-bar linkage is more complex than a simple pivoting motion produced by prior art cutting unit suspensions, there is still sufficient ground following, in the "pitching" mode, to prevent scalping or unmowed low areas. This complex movement is defined by the linkage geometry, and requires more vertical motion of the lift arm to occur than is required by single pivot systems, to traverse an equivalent ground contour. That is, cutting unit 20 is not permitted to undergo a simple or pure "pitching" movement in response to undulations in the turf. Rather, cutting unit 20 "rocks" fore-and-aft at the same time it pitches upwardly and downwardly, as depicted in FIG. 3, and this restraint on the motion of cutting unit 20 translates into an upward or downward force on corresponding lift arm 18. This vertical force, if upward, is vigorously opposed by a damper 76 (shown in FIGS. 12 and 13) if the velocity or frequency of the upward movement is within the range of velocities or frequencies against which damper 76 acts, as further described below. Thus, in the most preferred embodiment the four-bar linkage addresses the bobbing problem in conjunction with the damper 76. While either the four-bar linkage or damper 76 could act alone to help reduce cutting unit bobbing, in the most preferred embodiment they work together. As an example of how these components or systems could work alone, a damper could be used in conjunction with a simple cutting unit joint of the type which provides, for example, only "rolling" of the cutting unit. In that case, bobbing inducing forces would obviously tend to cause vertical movement of the lift arm, and the damper would come into play. As another example, a four-bar linkage operating alone, without a damper, can reduce bobbing even in the absence of a damper at the pivot joint, if the "virtual pull point" is located low enough to cause the cutting unit to seek equilibrium in such a way that the resistance forces on the rollers are automatically unloaded.

Figure 6:
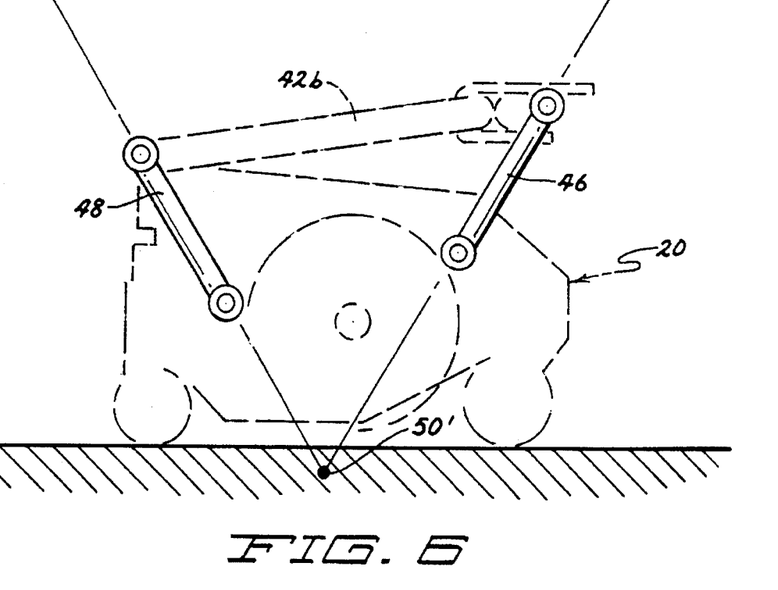
FIG. 6 is a diagrammatic side elevational view of the cutting unit of FIG. 2, illustrating the "virtual pull point" established by the four-bar linkage of the cutting unit joint, on level ground.
Figure 7:
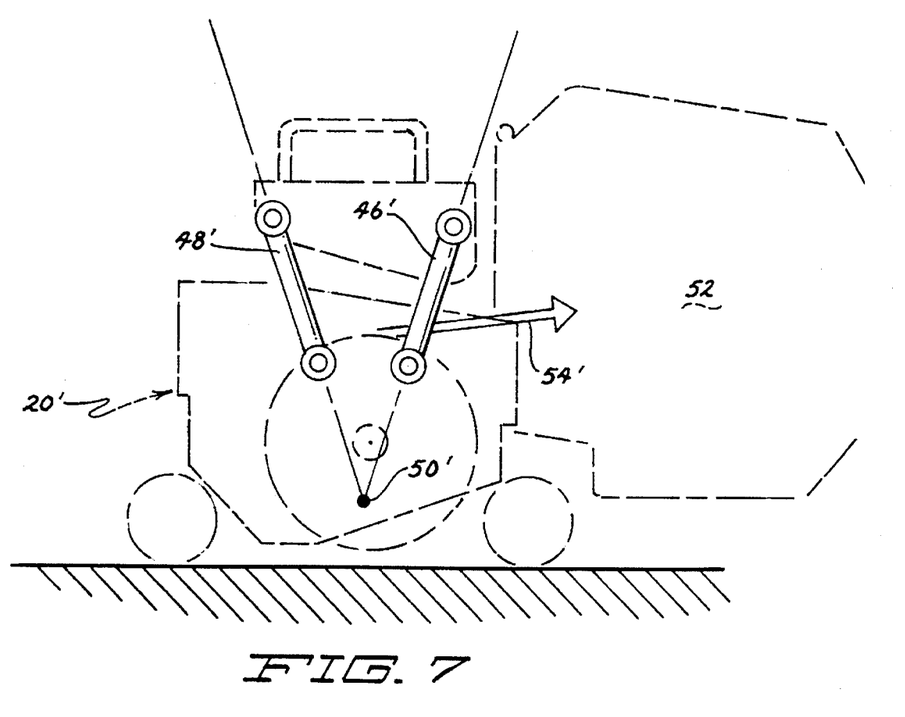
FIG. 7 is a diagrammatic side elevational view of a second embodiment of the present invention, illustrating a "virtual pull point" proximate the centerline of the reel, and illustrating a grass catcher supported by a lift arm.
Figure 8:
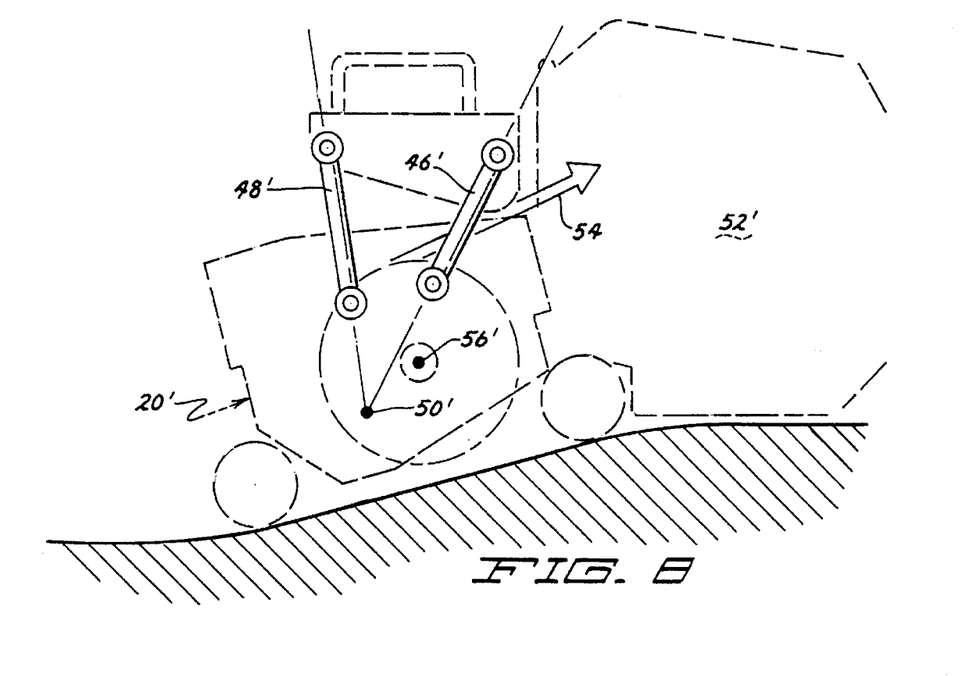
FIG. 8 is a second diagrammatic side elevational view of the cutting unit of FIG. 7, showing the cutting unit ascending a small hill.
Figure 9:
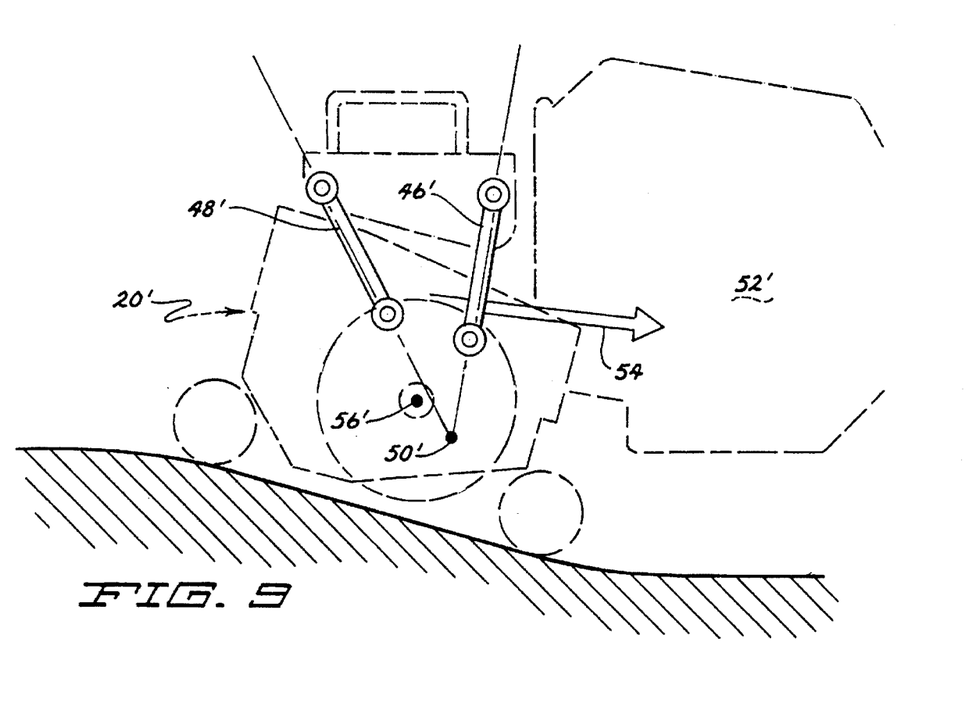
FIG. 9 is a third diagrammatic side elevational view of the cutting unit of FIG. 7, showing the cutting unit descending a small hill.

FIG. 6 again shows cutting unit 20 on substantially level ground, and illustrates the below grade virtual pull point 50. This can be contrasted with an alternative embodiment 20', shown in FIG. 7, wherein the virtual pull point 50' is located considerably higher. FIG. 7 illustrates, diagrammatically, an entirely different cutting unit 20', wherein a major concern is the "seal" between the cutting unit 20' and a grass basket 52' supported by the corresponding lift arm. The "seal" between cutting unit 20' and the grass basket 52' is a concern because the cutting unit 20' must be permitted to move relative to the lift arm, whereas the grass basket 52' is fixed to the lift arm. This is because, as described above, the grass basket can be quite heavy and is of variable weight. If it were supported by cutting unit 20', this would cause cutting unit 20' to have a variable weight, depending on the amount of grass clippings in grass basket 52'. This would cause the quality of cut and height of cut of cutting unit 20' to vary depending on the amount of grass clippings in grass basket 52', and also cause excessive compaction of the turf in some situations. FIGS. 8 and 9 show cutting unit 20' ascending and descending a small hill, respectively. As can be seen, the cutting unit 20' pivots considerably relative to grass basket 52'. However, cutting unit 20' would move even more were a standard cutting unit suspension system used. In most cases, with prior art cutting unit suspensions, the cutting unit would move away from the grass basket such that the "seal" would be lost and clippings would tend to fall to the ground. The rationale behind using the four-bar linkage system in connection with cutting unit 20' is to attempt to locate the virtual pull point 50' as close as possible to the centerline of the cutting reel, designated 51' in FIGS. 8 and 9. If the virtual pull point 50' were located directly on the centerline of the cutting reel, then the "seal" between the cutting unit 20' and the grass basket would be optimized. However, because of physical constraints, it is not always possible to arrange links 46' and 48' in such a way that they would "focus" directly on the reel centerline 51'. As shown in FIGS. 1 and 2, the side plates 30 of typical reel-type cutting units are quite crowded in terms of components and fasteners. This being the case, it is sometimes impossible to locate the actual pull point of a cutting unit in any particular location. That highlights one significant advantage of the four-bar linkage system of the present invention: by using pivoting, "focused" links to create a virtual pull point, the suspension elements and links for the cutting unit can be located where convenient, in effect, whereas the virtual pull point can be established by focusing the links anywhere on or off the cutting unit, even below grade (as discussed above in connection with the first embodiment). Arrows 54 generally represent the flow direction of the grass clippings produced by cutting unit 20'. It can be seen that in all cases the clippings flow into grass basket 52', attributable to the good "seal" between the cutting unit 20' and grass basket 52'.

With reference to FIGS. 7, 8 and 9, links 46' act generally in parallel with one another, and similarly links 48' act generally in parallel with one another. Links 46' and 48' are preferably constructed from cast steel and are about 4.75 inches long. The pivot or revolute joints, both at the cutting unit frame 40' and at the side plates 30', are constructed in a standard manner using bushings, studs, and the like. In this embodiment, the actual pivot point 49' (as opposed to the "virtual pull point") of each forward link 46' on the corresponding side plate 30' is located closer to the centerline 51' of the cutting reel; but is still located about midway between the upper edge of each side plate 30' and the centerline 51' of the cutting reel, top to bottom. This is in contrast to the suspension for cutting reel 20, shown in FIG. 6. Further with reference to cutting unit 20', the actual pivot point 55' for each rearward link 48' is located closer to the centerline 51' of the cutting reel; and at about the same vertical height or location as the front pivot point 49'. When the cutting unit 20' is on generally level ground, as shown in FIG. 7, the angle 61' between links 46' and 48' is about 38 degrees. When the cutting unit 20' is climbing a grade of about 15 degrees measured from the horizontal, as shown in FIG. 8, the angle 61' between links 46' and 48' is about 42 degrees. On the other hand, when the cutting unit 20' is descending a hill of about 15 degrees, measured from the horizontal, as shown in FIG. 9, the angle between links 46' and 48' is about 39 degrees.

It should be noted that the link angles given above are with respect to the front two cutting units of a so-called "triplex" mower; the rear cutting unit is preferably supported in such a way that the angle 61' between links 46' and 48' on level ground is about 50°, the difference simply being attributable to the fact that the links 46' and 48' connected to the side plates in a somewhat different manner in the case of the rear cutting unit. But even in this case, the virtual pull point is located near the centerline of the reel, for the reasons set forth herein.

As in the case of cutting unit 20, discussed above, if cutting unit 20' were to traverse a hill, as collectively shown in FIGS. 7, 8 and 9, instant center 50' would, in a sense, trace an upwardly turned curve or "smile," having its low point located as shown in FIG. 7, and having the upper corners of the "smile" located as shown in FIGS. 8 and 9. Note that in the case of cutting unit 20', the "smile" is considerably less pronounced as compared to the "smile" created or traced by virtual pull point 50 of cutting unit 20. Also, the "smile" of cutting unit 20' is much narrower than the "smile" of cutting unit 20. Again, the size and shape of the "smile" would depend, among other things, on the overall configuration of links 46' and 48', in terms of their absolute and relative lengths, and their actual pivot locations on side plates 30' and cutting unit frame 40'. In the case of cutting unit 20', it was desired to keep the virtual pull point 50' as close as possible to the centerline 51' of the cutting reel, to maintain a good "seal" between the cutting unit 20' and grass basket 52' as the cutting unit 20' pitches relative to grass basket 52'. In the case of cutting unit 20, it was desired to create a very low pull point on level ground, to minimize bobbing. Cutting unit 20 is used on a mower which typically operates at a higher speed than a mower which would use cutting units 20', and thus bobbing with regard to the former is more of problem.

Figure 10:
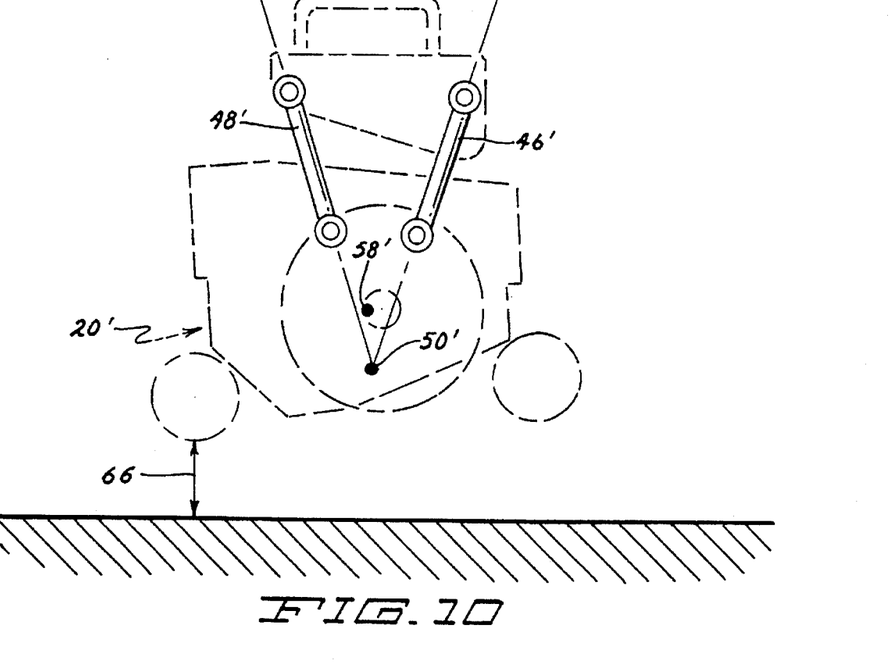
FIG. 10 shows a diagrammatic side elevational view of the cutting unit of FIG. 7, in a raised, transport position.
Figure 11:
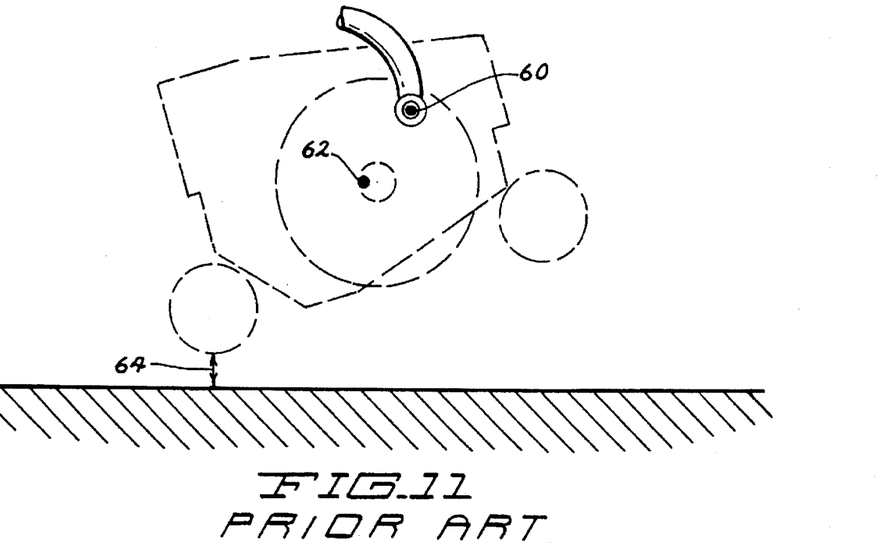
FIG. 11 shows a diagrammatic side elevational view of a prior art cutting unit, in its raised, transport position.

FIGS. 10 and 11 point out a still further advantage to the four-bar linkage suspension system described in connection with cutting unit 20'. FIG. 10 shows the cutting unit 20' in its transport position, i.e., raised up off of the ground. Cutting unit 20' hangs essentially level since the center of gravity of the cutting unit, designated with reference numeral 58' in FIG. 10, is located directly above the virtual pull point 50' of the cutting unit 20'. As such, there is no moment created by the weight of cutting unit 20' which would tend to pitch it forwardly or rearwardly. In fact, if there is a moment which would tend to rock the cutting unit 20', it will move in such a direction that the center of gravity will in effect position itself over the virtual pull point, thus stabilizing the cutting unit 20'. This is in sharp contrast to the prior art cutting unit shown in FIG. 11, which has pitched dramatically backwards. While FIG. 11 is not intended to depict any particular prior art cutting unit, it does generally show a typical prior art cutting unit. Note that the actual pull point of the cutting unit of FIG. 11 is located at the point labelled with reference numeral 60, and the center of gravity of the cutting unit is located at 62. This of course causes the cutting unit to rock or pitch dramatically backwards, in a counterclockwise direction. Thus, manufacturers of cutting units having this type of suspension have to include mechanical "stops" which cause mechanical interference between the cutting unit and the cutting unit carrier frame, so as to limit the dramatic counterclockwise (as viewed in FIG. 11) rotation of the cutting unit when it is raised into its transport position. The primary disadvantage of the situation depicted in FIG. 11 is that, for a given degree of lift provided by the lift arm, the lowest point of the cutting unit has not been raised terribly far off of the ground. The space between the cutting unit depicted in FIG. 11, labelled 64, is obviously considerably less than the space labelled 66 in FIG. 10, whereas in both cases the lift arm expended about the same amount of energy in terms of lifting.

Figure 12:
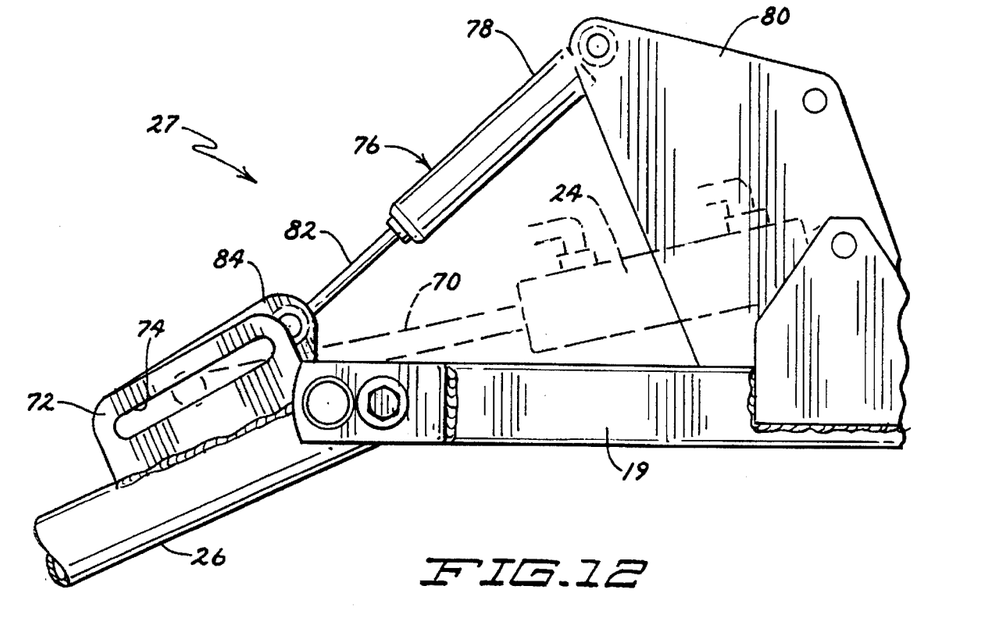
FIG. 12 is an enlarged front elevational view of one of the lift arm pivot joints of the turf maintenance machine of FIG. 1, in its operating position.
Figure 13:
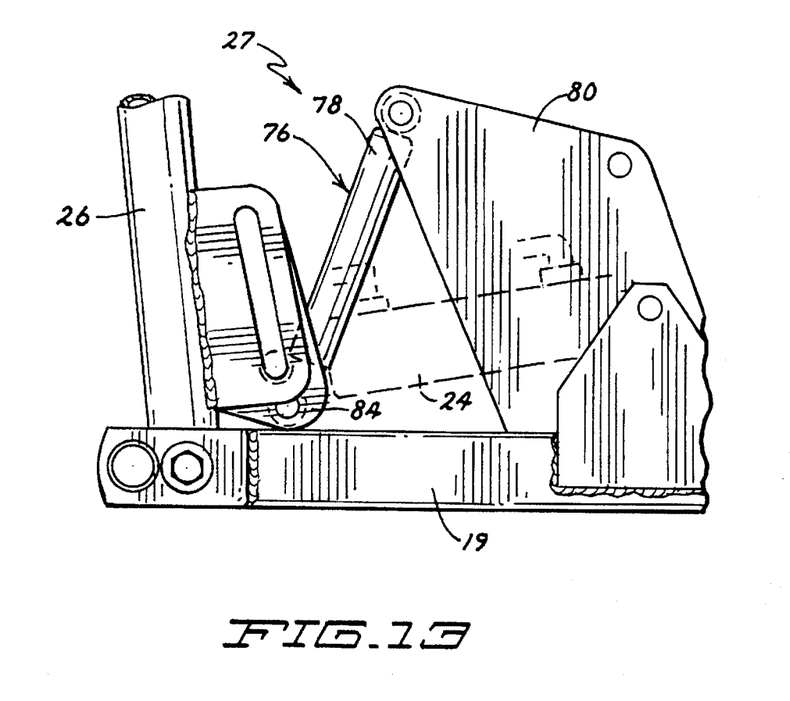
FIG. 13 is an enlarged front elevational view of the pivot joint shown in FIG. 12, in its transport position.

FIGS. 12 and 13 show a preferred pivot joint for a lift arm. The pivot joint 27 includes the vehicle frame or sub-frame 19, pivotally supporting lift arm 18 or, in the most preferred embodiment, lateral portion 26 thereof. A hydraulic cylinder 24, coupled at one end to frame 19 and coupled at the other end to lift arm portion 26, selectively raises the cutting unit into its transport position, and selectively lowers the cutting unit into its operating position, depending on the wishes of the operator.

Referring to FIGS. 12 and 13, it can be seen that the cylinder of hydraulic cylinder 24 is connected to frame 19, and the piston or rod 70 of hydraulic cylinder 24 is connected to lateral portion 26 of lift arm 18. Actually, there is an element 72 located atop portion 26, forming a slot 74, and the free end of rod 70 is slideably received by slot 74. This creates a "lost motion" connection between hydraulic cylinder rod 70 and lift arm 18, such that lift arm 18 can be raised or lowered with sufficient contraction or expansion of hydraulic cylinder 24, but wherein lift arm 18 can freely float relative to rod 70, by virtue of the rod 70 freely sliding in slot 74, during normal cutting operation. FIG. 12 shows the relative positions of the components of joint 27 when the cutting unit is in its operating position, whereas FIG. 13 shows the relative positions of the components when the cutting unit is in its transport position.

In addition to the hydraulic cylinder 24, there is a self-contained damper 76 interconnecting frame or sub-frame 19 and lift arm 18. Damper 76 is self-contained in the sense that it is not part of the overall hydraulic system of the mower. That is, damper 76 is preferably not simply part of the lift cylinder, for example, but is instead a separate element altogether. In a preferred embodiment, damper 76 includes a cylinder 78 which is pivotally connected to an element 80 rigidly fixed to frame 19; and a rod 82 pivotally connected to a tab 84 rigidly fixed to lift arm 18. In a preferred embodiment, damper 76 is similar to an automotive shock absorber, except that the preferred damper preferably does not include a spring element, and is primarily if not exclusively a "velocity dependent" component in the sense of providing virtually pure damping. The preferred damper 76 also has the feature that it provides significant resistance against upward movement of lift arm 18, at certain velocities, but essentially allows free fall of lift arm 18 in the downward direction. A preferred such damper is made by Arvin Ride Control Products, Inc., manufacturer of Gabriel shock absorbers, and is sold as part number 60531540. It should particularly be noted that a damper could be located even as a part of the cutting unit suspension, rather than in the pivot joint area. It is contemplated that, for example, a damper could be positioned between links 46 and 48 such that relative motion between these links could be "absorbed" by the damper, to limit bobbing of the cutting unit. Or, a damper could be positioned between one of the links 46 or 48 and one of the other links of the four-bar linkage. It has been found that bobbing occurs at about 6 to 15 cycles per second in a typical turf mower at about 4 to 8 miles per hour, creating a "wavelength" of about 9 to 12 inches. Ground following, on the other hand, occurs at frequencies about 4 cycles per second, or less. Thus, the damper can be chosen to resist frequencies or velocities normally associated with bobbing, and permit, relatively speaking, frequencies or velocities consistent with normal ground following.

Figure 14:
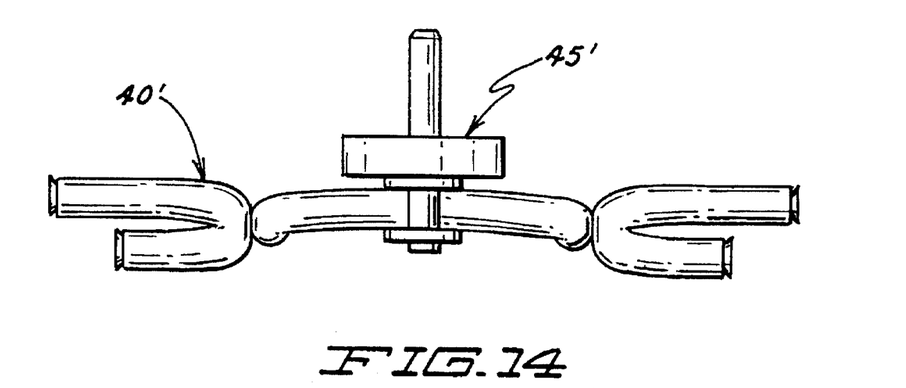
FIG. 14 is a front elevational view of an alternative cutting unit carrier frame.
Figure 15:
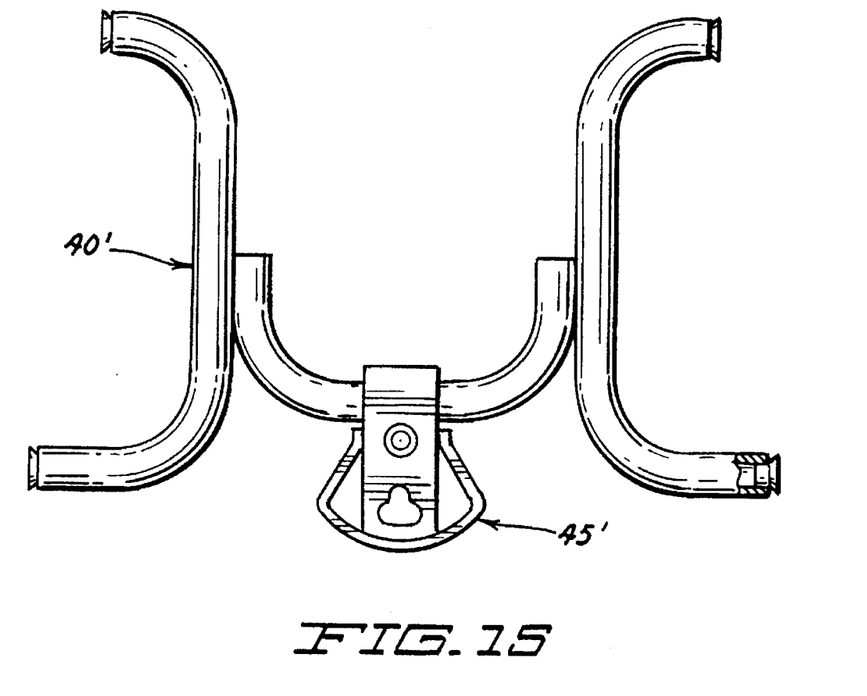
FIG. 15 is a top plan view of the alternative cutting unit carrier frame of FIG. 14.

FIGS. 14 and 15 illustrate an alternative embodiment 40' for the cutting unit carrier frame. The primary reason for the differences between the second embodiment shown in FIGS. 14 and 15 versus the first embodiment shown in FIGS. 4 and 5 is attributable to the fact that the second embodiment is thought to be somewhat easier to manufacture. In both cases, the purpose of the static portion of the cutting unit carrier frame 40 or 40' is simply to locate stationary pivot points in convenient places relative to links 46 and 48.

It should especially be noted that it is not necessary to have links 46 and 48 precisely as shown and described above. In fact, there could be, for example, fewer or more than four pivoting support links. For example, there could be a single pivoting link located toward the rear of a given cutting unit, with a pair of pivoting links located toward the front thereof. Those skilled in the art of linkage design will fully appreciate that the four-bar linkages shown and described above are exemplary, only.

Preferred embodiments of the invention are described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

We claim:

1. A turf maintenance machine comprising:
   (a) a traction vehicle;
   (b) a reel-type cutting unit; and
   (c) means including a four-bar linkage for connecting the cutting unit to the traction vehicle, wherein the connecting means comprises:
      i. a lift arm;
      ii. a pivot joint connecting the lift arm to the traction vehicle; and
      iii. a cutting unit joint connecting the cutting unit to the lift arm, wherein the four-bar linkage is a component of the cutting unit joint.

2. The turf maintenance machine of claim 1, wherein the pivot joint comprises a self-contained damper which prevents sudden upward movement of the lift arm consistent with cutting unit bobbing.

3. The turf maintenance machine of claim 1, wherein a virtual pull point is established by the four-bar linkage and the virtual pull point is below ground, when the cutting unit is on generally level ground, whereby cutting unit bobbing is substantially eliminated.

4. The turf maintenance machine of claim 1, wherein (i) the cutting unit is a reel-type cutting unit having a rotatable reel with a reel centerline; (ii) a virtual pull point is established by the four-bar linkage; and (iii) the virtual pull point is located proximate the reel centerline.

5. The turf maintenance machine of claim 1, wherein the cutting unit is a reel-type cutting unit having a rotatable reel with a reel centerline, and wherein the turf maintenance machine further comprises a grass basket supported by the lift arm, wherein a virtual pull point is established by the four-bar linkage and the virtual pull point is located proximate the centerline of the reel, whereby the grass basket and the cutting unit are maintained in close proximity even as the cutting unit follows the contour of the turf.

6. A turf maintenance machine comprising:
   (a) a traction vehicle;
   (b) a reel-type cutting unit; and
   (c) a cutting unit support system connecting the cutting unit to the traction vehicle, the support system comprising a four-bar linkage, wherein:
      i. a first bar of the four-bar linkage is rigidly connected to the cutting unit;
      ii. the cutting unit support system comprises a lift arm, and a second bar of the four-bar linkage is rigidly connected to the lift arm;
      iii. the lift arm carries a cutting unit carrier frame and attached to the carrier frame is a forward link and a rearward link;
      iv. the links are pivotally connected to the carrier frame and the cutting unit; and
      v. the forward link forms a third bar of the four-bar linkage, and the rearward link forms a fourth bar of the four-bar linkage.

7. The turf maintenance machine of claim 6, wherein the cutting unit is supported by a roller, and a virtual pull point is established at the point of intersection of imaginary lines passing through the links, wherein the virtual pull point is roughly located at the same height or below the cutting unit support roller.

8. The turf maintenance machine of claim 6, wherein a virtual pull point is established at the point of intersection of imaginary lines which pass through the links and the cutting unit comprises a cutting reel having a reel centerline, and wherein the virtual pull point is located proximate the reel centerline.

9. The turf maintenance machine of claim 6, wherein a virtual pull point is established by the four-bar linkage and the virtual pull point is below ground, when the cutting unit is on generally level ground, whereby cutting unit bobbing is substantially eliminated.

10. The turf maintenance machine of claim 6, wherein (i) a virtual pull point is established by the four-bar linkage; (ii) the cutting unit is supported by front and rear rollers; and (iii) the virtual pull point is proximate the rear roller when the cutting unit is ascending and proximate the front roller when the cutting unit is descending, whereby ground following is enhanced.

* * * * *